July 29, 1969    R. CLARK ET AL    3,457,891

PROPULSIVE SYSTEMS FOR VESSELS

Filed Aug. 30, 1968    3 Sheets-Sheet 1

July 29, 1969 R. CLARK ET AL 3,457,891
PROPULSIVE SYSTEMS FOR VESSELS
Filed Aug. 30, 1968 3 Sheets-Sheet 2
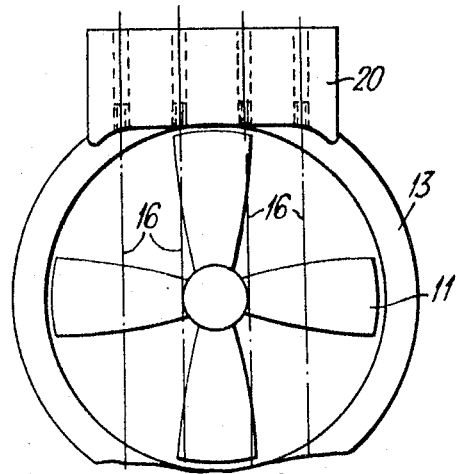
Fig. 3.
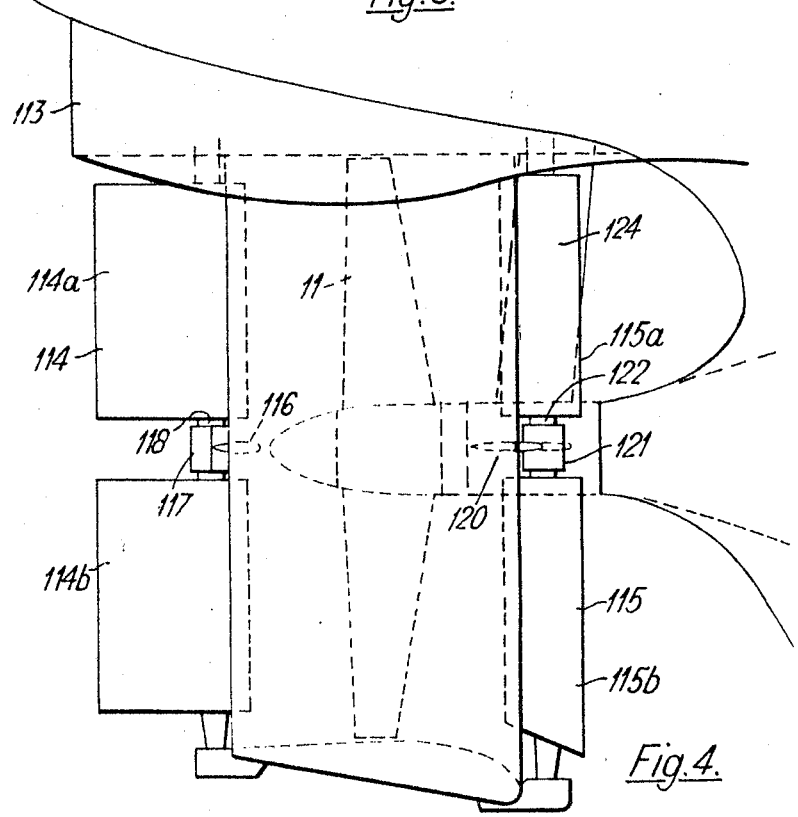
Fig. 4.

July 29, 1969　　　　R. CLARK ET AL　　　　3,457,891
PROPULSIVE SYSTEMS FOR VESSELS
Filed Aug. 30, 1968　　　　　　　　　　3 Sheets-Sheet 3

United States Patent Office 3,457,891
Patented July 29, 1969

3,457,891
PROPULSIVE SYSTEMS FOR VESSELS
Ronald Clark and Ewan Christian Brew Corlett, Basingstoke, England, assignors to Hydroconic Limited, London, England, a British company
Continuation-in-part of application Ser. No. 597,283, Nov. 28, 1966. This application Aug. 30, 1968, Ser. No. 756,617
Int. Cl. B63h 25/06, 25/00
U.S. Cl. 114—163                                10 Claims

ABSTRACT OF THE DISCLOSURE

A combined propulsion and steering unit for a marine vessel is provided comprising a fixed propulsion nozzle, a propeller operating therein, a cascade of vertical shutter rudders at the exit of the nozzle, and preferably also a further cascade of shutter rudders at the nozzle entry. To reduce the bending moment in the aft shutter rudders a horizontal strut is disposed diametrically across the nozzle exit and carries on its after edge bearings which halve the span of the shutters. This strut is adjusted as to horizontal angle so as to convert rotational energy from the rotating propeller race and is also removable to permit withdrawal aft of the propeller. Each shutter rudder is terminated above and below the strut, leaving only the stock in way of the strut and the bearing; this enables the two portions of the shutter to be independently angled. The arrangement at the nozzle entry is similar except that in this case the bearings are on the leading edge of the strut and the strut itself may be in two parts abutting a bearing boss for the propeller shaft.

CROSS REFERENCE TO RELATED APPLICATION

This application is a continuation-in-part of application Ser. No. 597,283, filed Nov. 28, 1966, now abandoned.

This invention relates to the steering of marine vessels fitted with propulsion nozzles.

The propulsion nozzle is a thrust augmenting device commonly fitted to screw-propelled vessels with screws operating under conditions of high loading. With such nozzles, steering may be effected by rotating the entire nozzle, which has the disadvantage of increasing the clearance from the screw to the nozzle and thereby reducing thrust; or by a normal rudder system, which has the disadvantage that it gives no steering when going astern; or by a normal rudder at exit of the nozzle for ahead steering and two flanking rudders, one on either side of the propeller shaft forward of the nozzle for astern steering.

In vessels which operate under high conditions of slip, i.e. tugs, it is generally desirable to fit large propellers and hence large nozzles where these are installed. With a single rudder or twin flanking rudders, even at large angles of helm, such as 60°, full blanking off of the nozzle and diversion of flow is not easy without having recourse to rudders of very large chord. As a result there is a tendency for a compromise to be effected between the propeller diameter and the rudder size, making the rudder rather larger than would otherwise be chosen and the propeller rather smaller, thereby limiting the performance of the vessel.

Furthermore, in the race from a propeller, especially under conditions of high slip, there is a considerable rotation component in the wake from the propeller and this store of energy is wasted in the overall propulsion of the vessel.

An object of the invention is to improve the steering of fixed nozzle vessels and at the same time reduce the steering torque, as compared with conventional installations, and extract hitherto wasted energy from the propeller.

According to the present invention, there is provided a propulsion and steering assembly for a marine vessel, comprising a propeller operating within a fixed propulsion nozzle, and having a set of multiple rudders or vertical shutters working at the entry and/or the exit of the nozzle.

It is a feature of such a system that the total torque for a given effect varies inversely as the square root of the number of rudder fins or blades and hence such an arrangement allows of considerably reduced steering gear torque.

Any number of rudder blades may be employed but it is desirable that when they are turned to port or starboard, the nose of one should be covered in a fore and aft direction by the tail of another, thereby allowing no straight-through flow and forcing the entire flow through the cascade formed by the rudder blades and discharging it in the direction of the blade chord. By so doing a very high efficiency of steering is obtained, impact losses are lessened compared with using a single or double blade, and the blades themselves can be of very simple construction with relatively light bearings at top and bottom compared with those of a normal rudder.

In one embodiment, the bending moment produced by the "lift" of each of the blades may be reduced by a horizontal strut fitted across the entrance or exit of the nozzle and containing bearings for the blades thereby effectively halving their span. In another embodiment, the stocks of the multiple rudders may be taken above the top of the nozzle into a sponson box where they may be coupled to one another thereby forming a self-contained steering nozzle system which may be constructed and added separately to a vessel without affecting rudder alignment.

In order to effect propeller withdrawal, the exit blades may be carried in a ring forming the tail or exit of a nozzle which may be detachable from the nozzle complete with the cross-strut, if fitted, and with the blades of the multiple rudders in their bearings.

Forms of propulsion unit for a tug will now be described by way of example, reference being had to the accompanying diagrammatic drawings, in which:

FIGURE 3 is an end elevation looking in the direction of the arrow 3 of FIGURE 1, FIGURE 4 is a side elevation of a second embodiment.

Figure 1:
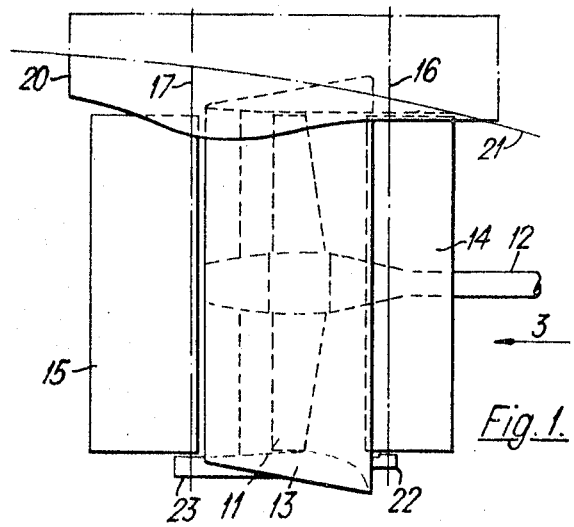
FIGURE 1 is a side elevation of one embodiment.
Figure 2:
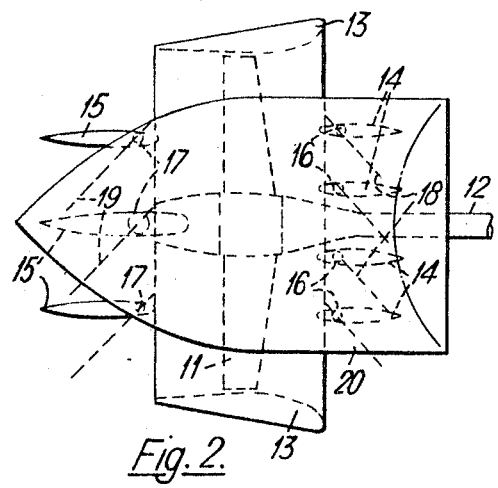
FIGURE 2 is a plan view of the embodiment of FIGURE 1.

Referring firstly to FIGURES 1 to 3 of the drawings, a propeller 11 driven by a propeller shaft 12 works in a propulsion nozzle 13. At the nozzle entry are fitted four equidistantly-spaced vertical rudder blades or shutters 14; three further equidistant blades 15 are fitted at the nozzle exit. The entry blades 14 are each mounted to turn about a respective vertical pivot 16 near the aft edge of the blade, while the exit blades 15 have pivots 17 near their forward edges. It will be observed that the spacing and dimensions of the blades are such that, both in the case of the entry blades and the exit blades, each multiple rudder can be turned until the nose of one blade is covered, in the fore and aft direction, by the tail of the blade next to it, as illustrated by the sets of broken lines 18, 19 in FIGURE 2.

A head box 20 overlies the nozzle 13, projecting beyond it both forward and aft, and serves as the means of securing the unit to the ship's hull 21. Pintles for the multiple rudder blades 14, 15 are journalled at their upper ends in the head box 20 and at their lower ends in bearing brackets 22, 23 projecting forward and aft from the bottom of the nozzle 13. Within the head box the blade pintles of each multiple rudder may be coupled together so that the blades turn in unison.

The blades may be so designed that they extract most or all of the rotational component of the race from the screw, thereby increasing the thrust of the nozzle and propeller assembly by a considerable amount which may be as much as 15%. This is effected, anyway, by the blades even if of symmetrical aerofoil section with zero incidence normally fore and aft due to the fact that the inflow velocity to them from the propeller is at an angle of incidence which results in their generating lift. However, they may be suitably angled or twisted so that the top half and the bottom half have opposite incidence and therefore may be more nearly suited to the inflow angles from the propeller wake and furthermore they may be twisted so that they have a progressive increase in angle of incidence to enable exact matching to the wake of the propeller.

When going ahead, the forward blades 14 are kept fore and aft and steering is effected by the after blades 15. When going astern, the reverse is the case, the forward blades 14 being used for steering and the after blades 15 being kept fore and aft.

Figure 5:
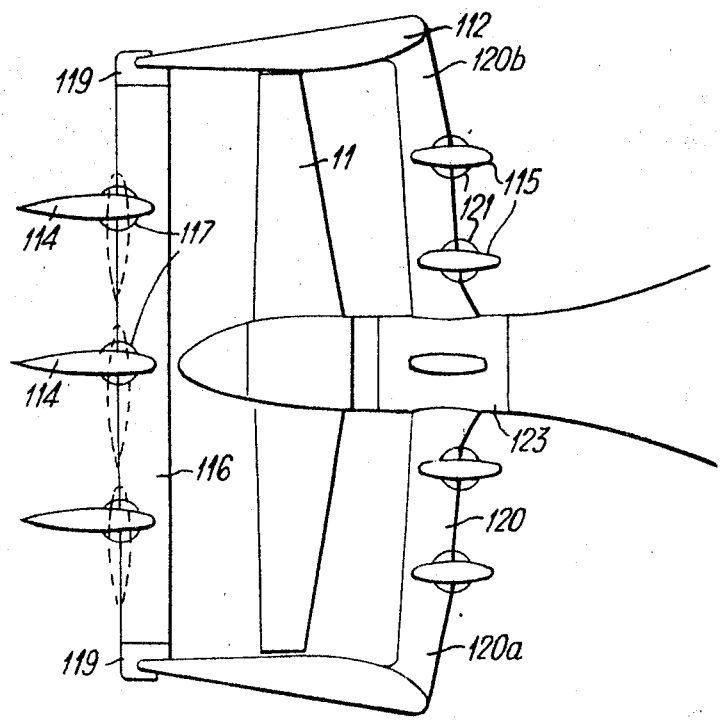
FIGURE 5 is a sectional plan of the arrangement of FIGURE 4.

In the arrangement of FIGURES 4 and 5, a horizontal strut across the nozzle carries on it pintles or bearings which halve the span of the shutters. At the exit of the nozzle this strut can be so adjusted in horizontal angle as to extract most advantageously rotational energy from the rotating propeller race; and it can carry the bearings on its after side, the rudder stocks of the after shutter rudders therefore passing down adjacent to the trailing edge of the strut. The shutter rudders are terminated above and below the strut, leaving only the stock in way of the strut and the bearing, and this enables the rudders above and below the bearing to be independently angled about the stock so as to make the best use of the rotation of the race and extract the maximum forward thrust therefrom.

Generally, propeller removal will be aft, and a particular feature of this arrangement is that it embodies a means of removing the horizontal strut. This strut can be bolted to lugs on the nozzle or can be attached by a lap welded arrangement or can be held thereto by studs, screws or similar fixing means, the manipulation of which allows the removal of the entire strut and bearings; the rudders are removed before hand. Hence, the demounting of the strut opens the exit of the nozzle for propeller removal.

At the entry side of the nozzle it is not necessary generally to have such an arrangement unless the propeller is removable forward, which may be the case in some particular instance where the propeller shaft support bearing is aft of the propeller. If the support bearing is aft of the propeller, the horizontal strut at the entry of the nozzle cannot be on the horizontal diameter but must be moved slightly above or below it to allow clearance from the propeller shaft.

In the general case where the support bearing for the propeller shaft is forward of the propeller, the support may take the form of a V bracket or A bracket supporting the bearing from the hull of the ship above it. However, in the preferred arrangement illustrated, a P bracket is used, this being a vertical bracket attaching the bearing boss to the hull and nozzle head box above, vertically above the propeller shaft. In this case, horizontal half-struts supporting the rudder bearings are disposed on the horizontal diameter of the nozzle and are attached to the P bracket at the shaft level. The half-struts port and starboard may be angled suitably to take the maximum advantage of the inflow angle of the race in order to extract energy therefrom as forward thrust.

In the case of these forward horizontal struts supporting the half-depth bearings of the forward shutters, the bearings are on the forward side or entry side of the strut. The bearings may be half-shell type bearings carrying a water lubricated surface and they may be split, the forward half of the bearing being removable by undoing bolts and thereby allowing the removal of the rudder in the normal way. A subsidiary object of the forward struts is to afford lateral stiffness and strength to the vertical P bracket and thereby produce a stiff but not redundant structure.

Referring more particularly to FIGURES 4 and 5, the propeller 11 is ducted in a nozzle 112 mounted beneath a nozzle box 113 under the hull stern, with three shutter rudders 114 at the nozzle exit and four rudders 115 at the entry. Across the diameter of the nozzle at the exit is a cross strut 116 of streamline section having bearing bosses 117 for the pintles 118 of the aft rudders 114 mounted on its trailing edge. Each of the aft rudders is split into an upper section 114a and a lower section 114b to accommodate the cross strut 116 and bearings 117. The cross strut 116 is secured by being bolted at its ends 119 to brackets on the nozzle, so that it is readily removable to allow the propeller to be withdrawn aft from the nozzle.

A second streamlined horizontal cross strut 120 is provided across the nozzle entry diameter to carry, at its leading edge, bearings 121 for the pintles 122 of the front shutters 115 in similar fashion, each front shutter being split into upper and lower sections 115a, 115b. The centre region of the nozzle entry is occupied by the propeller shaft bearing 123, which is carried from the hull on a depending P brackets 124, and therefore the cross strut 120 is in two sections 120a, 120b butt-welded to opposite sides of the shaft bearing boss.

Each of the bearings 117, 121 for the aft and forward shutter rudder pintles is of split construction to facilitate removal of the rudders.

The normal steering travel angle of the rudders is 60° on either side of the straight ahead position but provision is made for turning the aft rudders through a full 90° for emergency braking purposes, as shown in broken lines in FIGURE 5.

What we claim is:

1. A propulsion and steering assembly for a marine vessel, comprising a propeller operating within a fixed propulsion nozzle, and having a set of multiple rudders or vertical shutters working at the entry and/or the exit of the nozzle, wherein the blades of at least one multiple rudder set are supported at mid span by bearings on a cross strut at the nozzle entry or exit.

2. An assembly according to claim 1, wherein the blades of each multiple rudder set are equidistantly spaced in the direction athwartships and are arranged so that they can be turned to a steering position in which the nose of one blade is covered, in the fore and aft direction, by the tail of the next alongside it.

3. An assembly according to claim 1, wherein the entry and exit rudder blades have vertical pivots near their trailing and leading edges, respectively.

4. An assembly according to claim 1, wherein a head box overlies the nozzle and provides a means of mounting the assembly on a ship, and the rudder blades of at least one multiple rudder set have stocks or pintles that are journalled at their upper ends in the head box.

5. An assembly according to claim 4, wherein the lower ends of the stocks or pintles are journalled in the nozzle or in bearing brackets on the nozzle.

6. An assembly according to claim 5, wherein the blade pintles of at least one multiple rudder set are coupled together within the head box so that the blades turn in unison.

7. An assembly according to claim 1, wherein the top and bottom halves of each blade span are oppositely twisted.

8. An assembly according to claim 1, wherein said bearings are split to facilitate removal of the rudders.

9. An assembly according to claim 1, comprising a rear cross strut removably secured to the nozzle so that it can be detached for withdrawal of the propeller aft.

10. An assembly according to claim 1, comprising a forward cross strut in two sections abutting opposite sides of a propeller shaft bearing boss.

References Cited

UNITED STATES PATENTS 3,412,703  11/1968  Clark et al. _____ 114—163

ANDREW H. FARRELL, Primary Examiner

U.S. Cl. X.R.

114—166